United States Patent [19]

Nakamura et al.

[11] Patent Number: 4,948,696

[45] Date of Patent: Aug. 14, 1990

[54] RADIATION IMAGE RECORDING AND REPRODUCING METHOD

[75] Inventors: Takashi Nakamura; Kenji Takahashi, both of Kanagawa, Japan

[73] Assignee: Fuji Photo Film Co., Ltd., Kanagawa, Japan

[21] Appl. No.: 178,840

[22] Filed: Mar. 25, 1988

Related U.S. Application Data

[63] Continuation of Ser. No. 42,608, Apr. 23, 1987, abandoned, which is a continuation of Ser. No. 898,827, Aug. 20, 1986, abandoned, which is a continuation of Ser. No. 778,738, Sep. 23, 1985, abandoned, which is a continuation of Ser. No. 664,084, Oct. 23, 1984, abandoned, which is a continuation of Ser. No. 451,226, Dec. 20, 1982, abandoned.

[30] Foreign Application Priority Data

Dec. 24, 1981 [JP] Japan ............................... 56-212269

[51] Int. Cl.$^5$ ............................................. G03C 5/16
[52] U.S. Cl. ..................................... 430/139; 430/945; 430/967; 252/301.4 F; 428/691; 250/484.1
[58] Field of Search ............... 430/139, 945, 967, 21; 250/327.2, 483.1, 484.1 B; 252/301.4 F; 428/691

[56] References Cited

U.S. PATENT DOCUMENTS 3,650,976  3/1972  Luckey .......................... 252/301.4 S
3,778,615 12/1973  Luckey ................................ 250/475
4,080,306  3/1978  Ferretti ...................... 252/301.4 H
4,138,529  2/1979  Mori et al. .......................... 428/539
4,239,968 12/1980  Kotera et al. .................... 250/327.1

FOREIGN PATENT DOCUMENTS 0021174  1/1981  European Pat. Off. .
0021342  1/1981  European Pat. Off. .

Primary Examiner—Jose Dees
Attorney, Agent, or Firm—Sughrue, Mion, Zinn, Macpeak & Seas

[57] ABSTRACT

A radiation image recording and reproducing method comprising the steps of exposing a stimulable phosphor containing a bivalent europium activated complex halide phosphor represented by the formula:

$$BaFX \cdot xNaX' : aEu^{2+}$$

wherein X and X' each designated at least one of Cl, Br and I, x is a number satisfying $0 < x \leq 10^{-1}$, and "a" is a number satisfying $0 < a \leq 0.2$, to a radiation passing through an object to have the radiation energy stored in said stimulable phosphor, stimulating said stimulable phosphor by an electromagnetic wave having a wavelength within the range of 450 nm to 1,100 nm, thereby causing said stimulable phosphor to emit said radiation energy in the form of light, and detecting the emitted light.

6 Claims, 4 Drawing Sheets

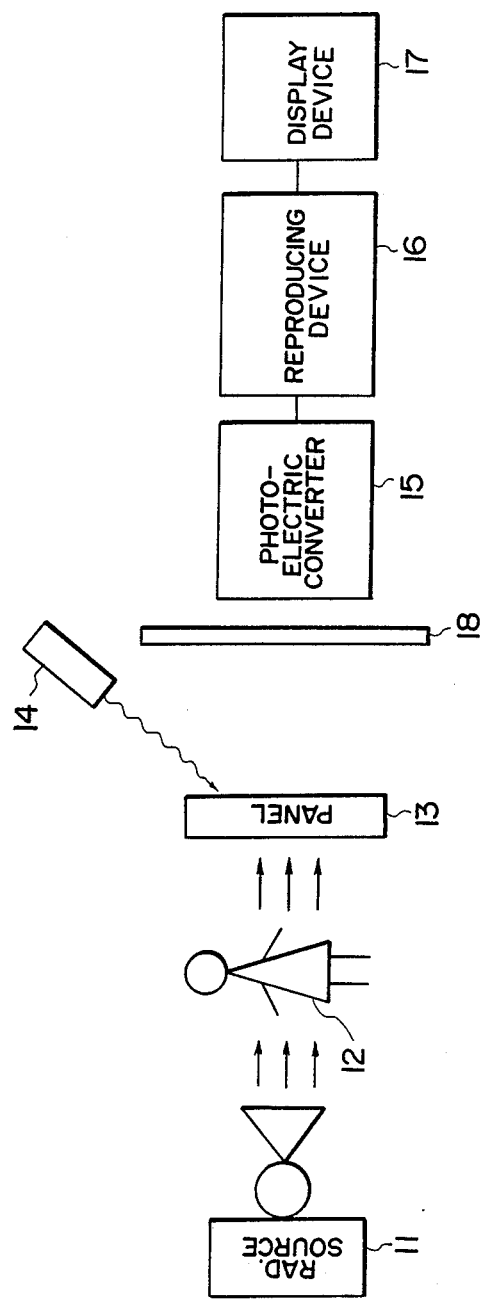
F I G. 5

RADIATION IMAGE RECORDING AND REPRODUCING METHOD

This is a continuation of application Ser. No. 06/042,608, filed Apr. 23, 1987 (now abandoned); which is a continuation of Ser. No. 989,827, filed Aug. 20, 1986 (now abandoned); which is a continuation of U.S. Ser. No. 06/778,738, filed Sept. 23, 1985 (now abandoned); which is a continuation of U.S. Ser. No. 664,084, filed Oct. 23, 1984 (now abandoned), which is a continuation of 06/451,226, filed Dec. 20, 1982 (now abandoned).

BACKGROUND OF THE INVENTION

1. Field of the Invention

This invention relates to a radiation image recording and reproducing method, and more particularly to a radiation image recording and reproducing method using a stimulable phosphor.

2. Description of the Prior Art

As disclosed in U.S. Pat. Nos. 3,859,527, 4,236,264, 4,276,473, and 4,315,318, it has been proposed to use a stimulable phosphor in a radiation image recording and reproducing method. The stimulable phosphor is able to store radiation energy upon exposure thereof to a radiation and then emits light in proportion to the stored energy upon stimulation by an electromagnetic wave selected from visible light and infrared rays. The radiation referred to here includes electromagnetic waves or corpuscular rays, e.g. X-rays, $\alpha$-rays, $\beta$-rays, $\gamma$-rays, high-energy neutron rays, electron beams, vacuum ultraviolet rays, ultraviolet rays and the like. In the radiation image recording and reproducing method, the stimulable phosphor is first exposed to a radiation passing through an object to have a radiation image stored therein, and is then scanned with an electromagnetic wave selected from visible light and infrared rays, which causes the stimulable phosphor to emit light in the pattern of the stored image. The light emitted by the stimulable phosphor upon stimulation thereof is photoelectrically detected and converted to an electric signal by use of a photoelectric converter such as a photomultiplier. The electric signal is processed as desired to reproduce a visible image of a quality suitable for viewing, particularly diagnostic purposes. This radiation image recording and reproducing method using the stimulable phosphor is advantageous over the conventional radiography using a photographic film provided with an emulsion layer containing a silver salt photographic material and an radiographic intensifying screen in that the image sharpness and the resolution of the obtained radiation image are excellent.

As a fluorohalide phosphor, there is known a bivalent europium activated barium fluorohalide phosphor represented by the following general formula:

in which X is at least one of Cl, Br and I, and "a" is a number satisfying $0 < a \leq 0.2$. When stimulated with X-rays, ultraviolet rays, electron beams or the like this phosphor instantaneously emits near ultraviolet rays of high luminance. Therefore, this phosphor is used as the phosphor for radiographic intensifying screens. Further, when exposed to a radiation, this phosphor stores the radiation energy therein Then, when the phosphor carrying the radiation energy is exposed to an electromagnetic wave having a wavelength within the range of 450 nm to 1,100 nm, the phosphor emits near ultraviolet rays of high luminance in proportion to the radiation energy stored therein. Accordingly, this phosphor can be used for the radiation image recording and reproducing method, as disclosed in U.S. Pat. No 4,239,968.

In case the aforesaid radiation image recording and reproducing method is used for medical diagnosis, it is desired that the sensitivity of the system be as high as possible in order to reduce the radiation dose applied to a patient. For this purpose, the stimulable phosphor used in the method is desired to emit light having as high luminance as possible upon stimulation thereof. Thus, a need exists for an improvement in the sensitivity of the radiation image recording and reproducing method using the BaFX:Eu$^{2+}$ phosphor. Namely, a need exists for an improvement in the luminance of light emitted by the BaFX:Eu$^{2+}$ phosphor upon stimulation thereof

SUMMARY OF THE INVENTION

The primary object of the present invention is to provide an improved radiation image recording and reproducing method using a stimulable phosphor.

Another object of the present invention is to provide a radiation image recording and reproducing method exhibiting a sensitivity higher than the sensitivity of the radiation image recording and reproducing method using the conventional BaFX:Eu$^{2+}$ phosphor.

The specific object of the present invention is to provide a radiation image recording and reproducing method using a novel stimulable phosphor capable of emitting light of higher luminance than the luminance obtainable with the conventional BaFX:Eu$^{2+}$ phosphor upon stimulation thereof.

It has been found that a novel phosphor comprising a complex halide matrix consisting essentially of a barium fluorohalide (BaFX), which is employed as the matrix of the BaFX:Eu$^{2+}$ phosphor, and a sodium halide represented by the formula NaX', wherein X' is at least one of Cl, Br and I, in a very small amount compared with the amount of BaFX, said complex halide matrix being activated with bivalent europium, emits near ultraviolet rays of higher luminance than the luminance available with the conventional BaFX:Eu$^{2+}$ phosphor upon stimulation thereof by an electromagnetic wave having a wavelength within the range of 450 nm to 1,100 nm.

Accordingly, the radiation image recording and reproducing method in accordance with the present invention comprises the steps of: exposing a stimulable phosphor containing a bivalent europium activated complex halide phosphor represented by the following general formula:

wherein X and X' each designate at least one of Cl, Br and I, x is a number satisfying $0 < x \leq 10^{-1}$, and "a" is a number satisfying $0 < a \leq 0.2$, to a radiation passing through an object to have the radiation energy stored in said stimulable phosphor, stimulating said stimulable phosphor by an electromagnetic wave having a wavelength within the range of 450 nm to 1,100 nm, thereby causing said stimulable phosphor to emit said radiation energy in the form of light, and detecting the emitted light.

Like the conventional BaFX:Eu$^{2+}$ phosphor, the bivalent europium activated complex halide phosphor employed in the radiation image recording and reproducing method in accordance with the present invention emits near ultraviolet rays upon stimulation thereof by an electromagnetic wave having a wavelength within the range of 450 nm to 1,100 nm after the phosphor is exposed to a radiation, for example, X-rays or the like. The luminance of the near ultraviolet rays emitted by the phosphor employed in the present invention is higher than the luminance of light emitted by the conventional $BaFX:Eu^{2+}$ phosphor upon stimulation thereof.

Accordingly, the radiation image recording and reproducing method in accordance with the present invention exhibits a higher sensitivity than the conventional radiation image recording and reproducing method using the $BaFX:Eu^{2+}$. Among the bivalent europium activated complex halide phosphors defined above, the phosphors represented by the aforesaid general formula in which x is a number satisfying $10^{-5} \leq x \leq 10^{-2}$ can emit light of a particularly high luminance upon stimulation thereof. Therefore, the radiation image recording and reproducing method using the phosphors represented by the general formula wherein x is a number within this range exhibits a particularly high sensitivity. Further, the phosphors represented by the general formula in which NaX' designates NaI or NaBr provide particularly high luminance. The phosphors represented by the general formula in which NaX' designates NaI is particularly preferable since these phosphors exhibit less decay of the radiation energy stored therein during the time interval between the radiation image recording and stimulation of the phosphors.

Further, in the general formula defined above, "a" preferably designates a number satisfying $10^{-5} \leq a \leq 10^{-1}$.

BRIEF DESCRIPTION OF THE DRAWINGS

FIG. 5 is a schematic explanatory view showing the radiation image recording and reproducing method in accordance with the present invention.

DESCRIPTION OF THE PREFERRED EMBODIMENTS

Figure 1:
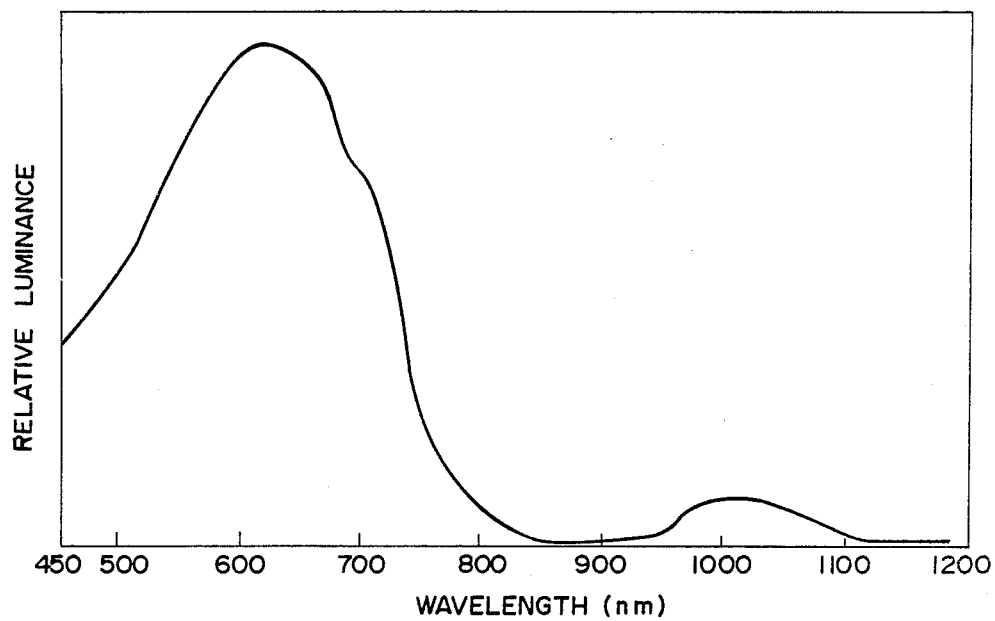
FIG. 1 is a graph showing the stimulation spectrum of the $BaFBr.10^{-3}NaBr:10^{-3}Eu^{2+}$ phosphor employed in the radiation image recording and reproducing method in accordance with the present invention.

The present invention will hereinbelow be described in further detail

The bivalent europium activated complex halide phosphor employed in the radiation image recording and reproducing method in accordance with the present invention can be prepared, for example, as described below.

As the raw materials for the phosphor, the following are used:
(i) barium fluoride ($BaF_2$),
(ii) at least one of barium chloride ($BaCl_2$), barium bromide ($BaBr_2$), and barium iodide ($BaI_2$),
(iii) at least one of sodium chloride (NaCl), sodium bromide (NaBr), and sodium iodide (NaI), and
(iv) a trivalent europium compound such as halides, oxides, nitrates, sulfates, or the like.

By using these raw materials (i) to (iv), a raw material mixture stoichiometrically represented by the formula

$BaFX.xNaX':aEu^{3+}$ in which X, X', x and "a" have the meanings as defined above, is prepared. The raw material mixture may be prepared by simply mixing all raw materials together. Alternatively, $BaF_2$ in (i) may first be caused to react with the barium halide in (ii) to form BaFX, and then the resulting BaFX may be mixed with the sodium halide in (iii) and the activator material in (iv). In the latter case, any known methods may be employed to form BaFX from $BaF_2$ and the barium halide. For example, as disclosed in Japanese Patent Publication No. 51(1976)-28591, BaFX may be formed by mixing $BaF_2$ and the barium halide, and heating the resulting mixture for several hours at a temperature of 100° C. or more (dry process). Alternatively, as disclosed in Japanese Unexamined Patent Publication No. 51(1976)-61499, BaFX may be formed by adding a solution of the barium halide to a suspension containing $BaF_2$, stirring the mixture preferably by heating it under a reduced pressure, and gradually removing the moisture from the mixture by evaporation (wet process). In both dry and wet processes, it is also possible to achieve intimate mixing of BaFX and the activator material simultaneously with the formation of BaFX by conducting the reaction in the presence of the activator material. In both processes, $BaF_2$, the barium halide, the sodium halide and the activator material are intimately mixed together, or BaFX, the sodium halide and the activator material are intimately mixed together. The mixing can be conducted by use of an ordinary mixer such as a ball mill or a rod mill.

Thereafter, the raw material mixture thus obtained is introduced into a heat-resistant vessel such as a quartz boat, an alumina crucible, or a quartz crucible, and fired in an electric furnace. The firing temperature is preferably within the range of 600° to 1,000° C. The firing time is generally within the range of one to six hours, depending on the amount of the raw material mixture introduced in the heat-resistant vessel, the firing temperature, and the like. The firing is conducted in a weak reducing atmosphere, such as a nitrogen gas atmosphere containing a small amount of hydrogen gas, or a carbon dioxide gas atmosphere containing a small amount of carbon monoxide. In this way, trivalent europium is reduced to bivalent europium during the firing. After the raw material mixture is fired under the firing conditions described above, the fired product may be taken out of the electric furnace, allowed to cool, and pulverized. The obtained particles of the fired product may then be introduced into a heat-resistant vessel again, and fired in an electric furnace under the same firing conditions as described above. In this case, the second firing may be conducted in a neutral atmosphere such as a nitrogen gas atmosphere, or an argon gas atmosphere, instead of the weak reducing atmosphere employed in the first firing. After the firing is finished, the obtained fired product is pulverized and treated according to the methods usually employed in the manufacture of phosphors, such as sieving, to obtain the phosphor employed in the present invention.

By the process described above, the bivalent europium activated complex halide phosphor represented by the following general formula:

$$BaFX \cdot xNaX':aEu^{2+}$$

wherein X and X' each designate at least one of Cl, Br and I, x is a number satisfying $0 < x \leq 10^{-1}$, and "a" is a number satisfying $0 < a \leq 0.2$, is obtained. Like the conventional $BaFX:Eu^{2+}$ phosphor, the bivalent europium activated complex halide phosphor emits near ultraviolet rays upon stimulation thereof by an electromagnetic wave having a wavelength within the range of 450 nm to 1,100 nm after the phosphor is exposed to a radiation, for example, X-rays or the like. The luminance of the near ultraviolet rays emitted by the phosphor employed in the present invention is higher than the luminance of light emitted by the conventional $BaFX:Eu^{2+}$ phosphor upon stimulation thereof. Accordingly, the radiation image recording and reproducing method in accordance with the present invention exhibits a higher sensitivity than the conventional radiation image recording and reproducing method using the $BaFX:Eu^{2+}$.

Figure 2:
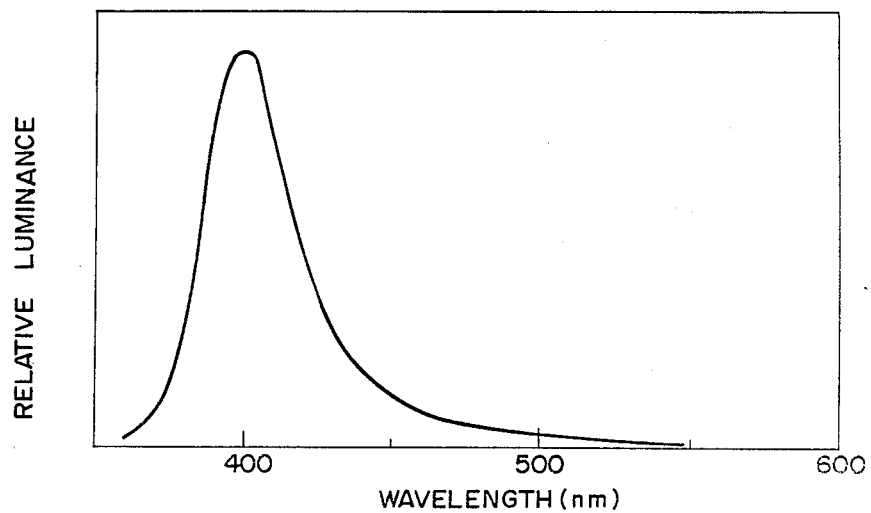
FIG. 2 is a graph showing the emission spectrum obtained upon stimulation of the $BaFBr.10^{-3}NaBr:10^{-3}Eu^{2+}$ phosphor employed in the radiation image recording and reproducing method in accordance with the present invention.
Figure 3:
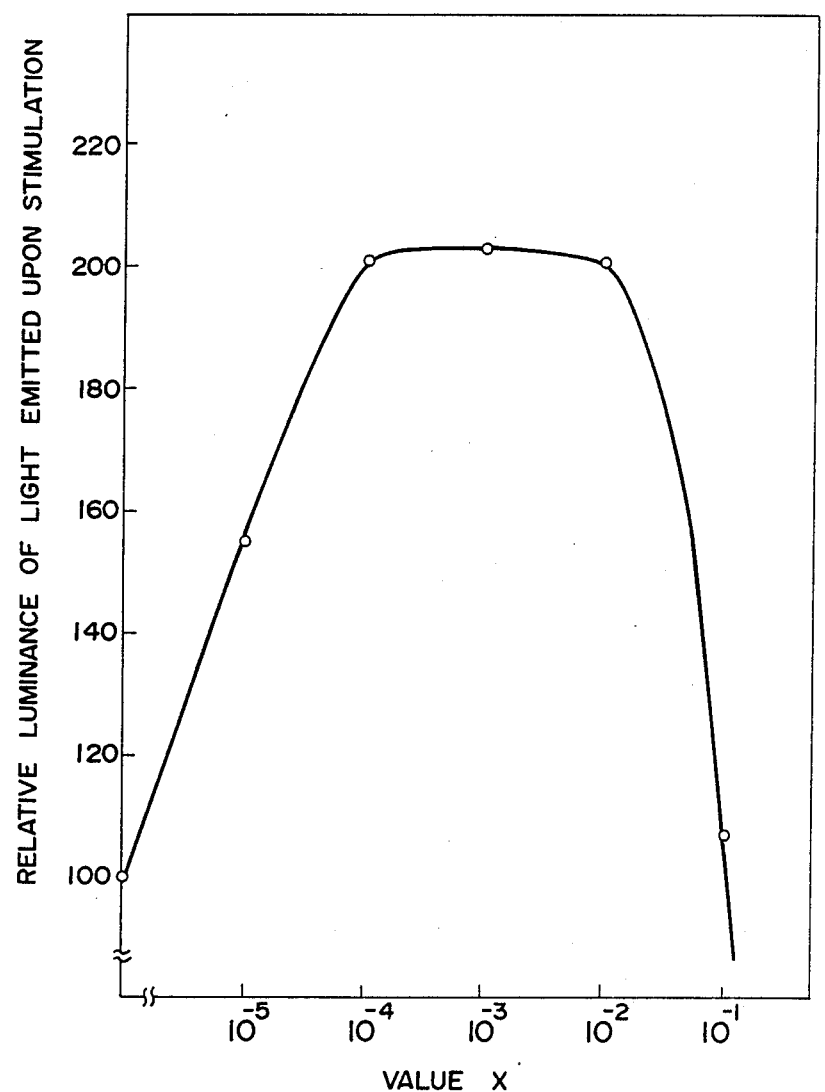
FIG. 3 is a graph showing the relationship between the value x for NaBr in the $BaFBr.xNaBr:10^{-3}Eu^{2+}$ phosphor and the luminance of light emitted by the phosphor upon stimulation thereof.
Figure 4:
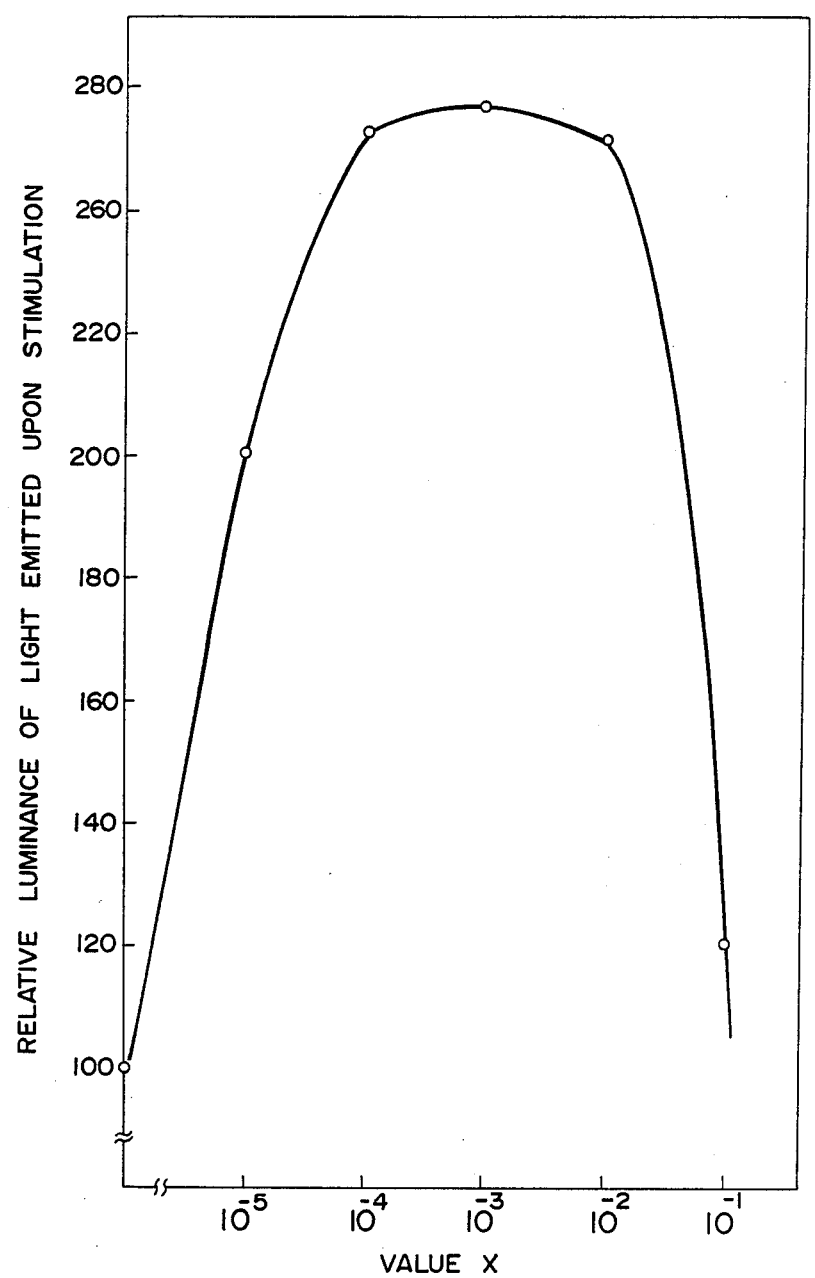
FIG. 4 is a graph showing the relationship between the value x for NaBr in the $BaFCl.xNaBr:10^{-3}Eu^{2+}$ phosphor and the luminance of light emitted by the phosphor upon stimulation thereof.

FIG. 1 shows the stimulation spectrum of the bivalent europium activated complex halide phosphor employed in the radiation image recording and reproducing method in accordance with the present invention. The stimulation spectrum was obtained by use of a $BaFBr \cdot 10^{-3}NaBr:10^{-3}Eu^{2+}$ phosphor sample exposed to X-rays emitted at a tube voltage of 80 kVp. As shown in FIG. 1, the stimulable wavelength range for this phosphor is between 450 nm and 1,100 nm, and the optimum stimulable wavelength range therefor is between 450 nm and 750 nm. The stimulable wavelength range for the bivalent europium activated complex halide phosphors employed in the radiation image recording and reproducing method in accordance with the present invention slightly varies depending upon the composition of the phosphors. In general, however, the stimulable wavelength range for these phosphors is approximately equal to the range shown in FIG. 1, i.e. between 450 nm and 1,100 nm, and the optimum stimulable wavelength range therefor is between 450 nm and 750 nm. When the stimulating rays used for stimulating the stimulable phosphor to cause it to emit light have a wavelength within this range, it is possible to stimulate the phosphors without substantially raising the temperature of the phosphors. The above-mentioned stimulable wavelength range and the optimum stimulation wavelength range for the phosphor employed in the present invention are approximately identical with those for the conventional $BaFX:Eu^{2+}$ phosphor FIG. 2 shows the emission spectrum obtained upon stimulation of the bivalent europium activated complex halide phosphor employed in the radiation image recording and reproducing method in accordance with the present invention. The light emission spectrum was obtained by exposing the $BaFBr \cdot 10^{-3}NaBr \cdot 10^{-3}Eu^{2+}$ phosphor to X-rays emitted at a tube voltage of 80 kVp, and then stimulating the phosphor by a He—Ne laser beam having a wavelength of 633 nm. The emission spectrum of the bivalent europium activated complex halide phosphors employed in the present invention slightly varies depending upon the composition of the phosphors. In general, however, these phosphors emit near ultraviolet rays as shown in FIG. 2 upon stimulation thereof. The emission spectrum of the complex halide phosphor employed in the present invention is approximately identical with the light emission spectrum of the conventional $BaFX:Eu^{2+}$ phosphor FIG. 3 shows the relationship between the value x for NaBr, which is a constituent of the matrix of the $BaFCl \cdot xNaBr:10^{-3}Eu^{2+}$ phosphor, and the luminance of light emitted by the phosphor upon stimulation thereof. FIG. 4 shows the relationship between the value x for NaBr, which is a constituent of the matrix of the $BaFCl \cdot xNaBr:10^{-3}Eu^{2+}$ phosphor, and the luminance of light emitted by the phosphor upon stimulation thereof. In FIGS. 3 and 4, the value x is plotted on abscissa, and the luminance is plotted on ordinate These graphs were obtained by exposing the phosphors to X-rays emitted at a tube voltage of 80 kVp, and then stimulating the phosphors by a He—Ne laser beam having a wavelength of 633 nm. The luminance plotted on ordinate in FIG. 3 is expressed in terms of the relative value with the luminance of light emitted by the $BaFBr:10^{-3}Eu^{2+}$ phosphor upon stimulation thereof taken as 100. The luminance plotted on ordinate in FIG. 4 is expressed in terms of the relative value with the luminance of light emitted by the $BaFCl:10^{-3}Eu^{2+}$ phosphor upon stimulation thereof taken as 100. As shown in FIGS. 3 and 4, the $BaFBr \cdot xNaBr:10^{-3}Eu^{2+}$ phosphor and the $BaFCl \cdot xNaBr:10^{-3}Eu^{2+}$ phosphor, wherein x is a number satisfying $0 < x \leq 10^{-1}$, which are employed in the present invention emit light of a higher luminance than the luminance of the $BaFBr:10^{-3}Eu^{2+}$ phosphor and the $BaFCl:10^{-3}Eu^{2+}$ phosphor which respectively correspond to the aforesaid phosphors wherein x is 0. Further, from FIGS. 3 and 4, it is understood that the $BaFBr \cdot xNaBr:10^{-3}Eu^{2+}$ phosphor and the $BaFCl \cdot xNaBr:10^{-3}Eu^{2+}$ phosphor wherein x is a number satisfying $10^{-5} < x \leq 10^{-2}$ emit light having particularly high luminance upon stimulation thereof. Furthermore, experiments revealed that, also in the $BaFBr \cdot xNaI:10^{-3}Eu^{2+}$ phosphor and the $BaFCl \cdot xNaI:10^{-3}Eu^{2+}$ phosphor containing NaI as the sodium halide constituting the phosphor matrix, the relationships between the value x for NaI and the luminance of light emitted by the phosphors upon stimulation thereof are approximately identical with the relationships shown in FIGS. 3 and 4, respectively. As for the $BaFBr \cdot xNaCl:10^{-3}Eu^{2+}$ phosphor and the $BaFCl \cdot xNaCl:10^{-3}Eu^{2+}$ phosphor, it has been found that the luminance of light emitted by these phosphors upon stimulation thereof are improved when the value x is between $10^{-5}$ and $10^{-1}$, although the curves indicating the relationships between the value x and the luminances of light emitted by these phosphors upon stimulation thereof are not so tall as the curves shown in FIGS. 3 and 4 are. It has also been found that the complex halide phosphors employed in the present invention, wherein the value "a" for $Eu^{2+}$ is not $10^{-3}$, exhibit the value x-luminance relationships approximately identical with the curves shown in FIGS. 3 and 4.

FIG. 5 schematically shows the radiation image recording and reproducing method in accordance with the present invention. In FIG. 5, a radiation source 11, an object 12, and a radiation image storage panel 13 provided with a stimulable phosphor layer containing the bivalent europium activated complex halide phosphor defined above are positioned as shown. A stimulating ray source 14 is positioned to emit stimulating rays which causes the radiation image storage panel 13 to emit light in proportion to the latent radiation image stored thereon Reference numeral 15 designates a photoelectric converter for detecting light emitted by the radiation image storage panel 13 upon stimulation thereof, and reference numeral 16 designates a device for reproducing an image from the electric signal obtained from the photoelectric converter 15. Reference numeral 17 denotes a device for displaying the reproduced image, and reference numeral 18 denotes a filter for cutting off the stimulating rays emitted by the stimulating ray source 14 and passing only the light emitted by the radiation image storage panel 13 upon stimulation thereof. The devices 15 to 17 may be replaced by any devices that can reproduce an image by use of the light information obtained from the radiation image storage panel 13.

In FIG. 5, when the object 12 is exposed to a radiation emitted by the radiation source 11, the radiation passes through the object 12 according to the radiation transmittance at each portion of the object 12, and an image of the radiation transmission pattern reaches the radiation image storage panel 13. When the radiation transmission image is absorbed by the stimulable phosphor layer of the radiation image storage panel 13, electrons or positive holes are generated in the phosphor layer in a number proportional to the amount of radiation absorbed in the phosphor layer, and stored on the trap level of the stimulable phosphor. In this way, a latent radiation transmission image is formed on the radiation image storage panel 13. Thereafter, the latent image is developed by stimulating it with photoenergy. Namely, the stimulable phosphor layer of the radiation image storage panel 13 is scanned with the stimulating rays emitted by the stimulating ray source 14 in order to expel the electrons or the positive holes stored on the trap level of the stimulable phosphor. As a result, light is emitted by the phosphor layer in proportion to the radiation energy stored therein. As described above, the stimulable wavelength range for the bivalent europium activated complex halide phosphor contained in the stimulable phosphor layer of the radiation image storage panel 13 is between 450 nm and 1,100 nm, and the optimum stimulation wavelength range therefor is between 500 nm and 800 nm. Accordingly, as the stimulating rays, an electromagnetic wave having a wavelength within the range of 450 nm to 1,100 nm, preferably 450 nm to 750 nm is employed. When the wavelength of the stimulating rays is within the range of 450 nm to 750 nm, the stimulable phosphor layer can be stimulated without substantially raising the temperature of the phosphor, and therefore it is possible to prevent the phosphor and the phosphor layer from being deteriorated due to a change in temperature.

The intensity of the light emitted by the stimulable phosphor layer upon stimulation thereof by the stimulating rays is proportional to the number of the electrons or the positive holes stored in the phosphor layer, i.e. to the intensity of the radiation energy absorbed by the phosphor layer of the radiation image storage panel 13. The emitted light is converted to an electric signal by the photoelectric converter 15 such as a photomultiplier, and reproduced into a visible image by the image reproducing device 16. The visible image is displayed on the image display unit 17.

The radiation image storage panel employed in the radiation image recording and reproducing method in accordance with the present invention is provided with the stimulable phosphor layer containing the bivalent europium activated complex halide phosphor dispersed in an appropriate binder. When the stimulable phosphor layer is self-supporting, the phosphor layer can by itself form the radiation image storage panel. In general, however, the stimulable phosphor layer is formed on an appropriate substrate to constitute the radiation image storage panel. Usually, a protective layer for physically and chemically protecting the phosphor layer is positioned on one side of the phosphor layer opposite to the substrate. A prime-coating layer may be positioned between the phosphor layer and the substrate in order to closely the phosphor layer and the substrate. As disclosed in U.S. patent application Ser. No. 156,520 (European Patent Publication No. 21174), the radiation image storage panel may be colored by use of a colorant. In case the stimulable phosphor layer is colored, it is preferable that the coloring degree gradually increases from the stimulating ray incidence side to the opposite side.

The stimulable phosphor layer of the radiation image storage panel may contain any known stimulable phosphors that emit light upon stimulation thereof by an electromagnetic wave having a wavelength within the range of 450 nm to 1,100 nm, in combination with the $BaFX.xNaX':aEu^{2+}$ phosphor employed in the present invention. As the known stimulable phosphors, the rare earth element activated lanthanum oxyhalide phosphors as shown in U.S. Pat. No. 4,236,078, and the rare earth element activated alkaline earth metal fluorohalide phosphors as shown in U.S. Pat. Nos. 4,236,078, 4,239,968, Japanese Unexamined Patent Publication Nos. 55(1980)-12143, 55(1980)-84389, 56(1981)-2385, 56(1981)-2386, and 56(1981)-74175 are preferred.

Further, in the radiation image storage panel, white powder may be dispersed in the stimulable phosphor layer, as disclosed in U.S. Pat. No. 4,350,893. Furthermore, as disclosed in U.S. patent application Ser. Nos. 268,794, U.S. Pat. No. 4,411,944 and 168,801 U.S. Pat. No. 4,380,702, a metallic light-reflecting layer or a white pigment light-reflecting layer may be positioned on the side of the stimulable phosphor layer opposite to the stimulating ray incidence side. By using the colorant, white powder or light-reflecting layer as described above, it is possible to obtain a radiation image storage panel capable of reproducing a sharp image.

In the present invention, the stimulating ray source for emitting the light energy for stimulating the stimulable phosphor layer of the radiation image storage panel may be a light source emitting light having the band spectrum distribution within the wavelength range of 450 nm to 1,100 nm, or a light source emitting light having a single wavelength, such as a He-Ne laser beam (633 nm), a YAG laser beam (1,064 nm), a ruby laser beam (694 nm) or an argon laser beam (488 nm). These layer beams can provide high stimulation energy. Among the laser beams, the He—Ne laser beam is more preferable.

The present invention is further illustrated by the following nonlimitative examples.

EXAMPLE 1

In a ball mill, 175.5 g (1 mol) of $BaF_2$, 297.1 g (1 mol) of $BaBr_2$, 0.206 g ($2 \times 10^{-3}$ mol) of NaBr and 0.783 g ($2 \times 10^{-3}$ mol) of $EuBr_3$ were intimately mixed together. The raw material mixture thus obtained was introduced into a quartz boat, which was then put in a tube furnace for firing. The firing was conducted for two hours at a temperature of 900° C. while nitrogen gas containing 1% by volume of hydrogen gas was introduced into the tube furnace at a flow rate of 280 cc/minute. After the firing was finished, the quartz boat was taken out of the tube furnace and allowed to cool to room temperature. The fired product thus obtained was pulverized in a ball mill, and the resulting particles of the fired product were again introduced into a quartz boat, which was put in a tube furnace for secondary firing. The secondary firing was conducted for one hour at 700° C. while nitrogen gas was introduced into the tube furnace at a flow rate of 280 cc/minute. After the secondary firing was over, the quartz boat was taken out of the tube furnace, and allowed to cool to room temperature. The fired product thus obtained was pulverized and sieved. In this way, a BaFBr.$10^{-3}$NaBr:$10^{-3}$Eu$^{2+}$ phosphor was obtained.

Further, a BaFBr.$10^{-3}$NaCl:$10^{-}$Eu$^{2+}$ phosphor and a BaFBr.$10^{-3}$NaI:$10^{-3}$Eu$^{2+}$ phosphor were prepared in the same way as described above, except that 0.117 g ($2\times10^{-3}$ mol) of NaCl and 0.30 g ($2\times10^{-3}$ mol) of NaI were respectively used instead of NaBr. In addition, a BaFBr:$10^{-3}$Eu$^{2+}$ phosphor was prepared in the same way as described above, except that NaBr was omitted.

Thereafter, radiation image storage panels were made by using the four kinds of phosphors prepared as described above. These panels were made as described below.

First, eight parts by weight of the phosphor and one part by weight of nitrocellulose (binder) were mixed with each other in a solvent (mixture of acetone, ethyl acetate and butyl acetate) to prepare a coating a solution having a viscosity of approximately 50 centistokes. Then, the coating solution was uniformly applied onto a polyethylene terephthalate film (substrate) placed horizontally, and allowed to dry naturally for a day to form a phosphor layer having a thickness of about 300µ on the substrate.

Thereafter, the luminances of light emitted from the four kinds of the radiation image storage panels thus obtained upon stimulation thereof were measured This measurement was conducted by exposing each radiation image storage panel to X-rays emitted at a tube voltage of 80 kVp, stimulating the phosphor layer by a He—Ne laser beam having a wavelength of 633 nm, and receiving the light emitted by the phosphor layer by a light receiver (a photomultiplier of spectral sensitivity S-5)

The luminances of light emitted by the radiation image storage panels made of the BaFBr.$10^{-3}$NaBr:$10^{-3}$Eu$^{2+}$ phosphor, the BaFBr.$10^{-3}$NaCl:$10^{-3}$Eu$^{2+}$ phosphor, and the BaFBr.$10^{-3}$NaI:$10^{-3}$Eu$^{2+}$ phosphor, respectively, upon stimulation thereof were approximately double the luminance of light emitted by the radiation image storage panel made of the BaFBr:$10^{-3}$Eu$^{2+}$ phosphor upon stimulation thereof. Accordingly, the sensitivity of the radiation image recording and reproducing method using these radiation image storage panels in accordance with the present invention is approximately double the sensitivity of the method using the radiation image storage panel made of the BaFBr:$10^{-3}$Eu$^{2+}$ phosphor

EXAMPLE 2

A BaFCl.$10^{-3}$NaCl:$10^{-3}$Eu$^{2+}$ phosphor was prepared in the same way as described in Example 1, except that 175.3 g (1 mol) of BaF$_2$, 208.2 g (1 mol) of BaCl$_2$, 0.117 g ($2\times10^{-3}$ mol) of NaCl, and 0.517g ($2\times10^{-3}$ mol) of EuCl$_3$ were used as the raw materials. Further, a BaFCl.$10^{-3}$NaBr:$10^{-3}$Eu$^{2+}$ phosphor and a BaFCl.$10^{-3}$NaI:$10^{-3}$Eu$^{2+}$ phosphor were prepared in the same way as described above, except that 0.206g ($2\times10^{-3}$ mol) of NaBr and 0.30g ($2\times10^{-3}$ mol) of NaI were respectively used instead of NaCl. Further, a BaFCl:$10^{-3}$Eu$^{2+}$ phosphor was prepared in the same way as described above, except that NaCl was omitted.

Thereafter, radiation image storage panels were made in the same way as described in Example 1 by using the four kinds of phosphors prepared as described above. Then, the luminances of light emitted by the four kinds of the radiation image storage panels thus obtained upon stimulation thereof were measured in the same way as described in Example 1.

The luminances of light emitted by the radiation image storage panels made of the BaFCl.$10^{-3}$NaCl:$10^{-3}$Eu$^{2+}$ phosphor, the BaFCl.$10^{-3}$NaBr:$10^{-3}$Eu$^{2+}$ phosphor and the BaFCl.$10^{-3}$NaI:$10^{-3}$Eu$^{2+}$ phosphor, respectively, upon stimulation thereof were approximately double the luminance of light emitted by the radiation image storage panel made of the BaFCl:$10^{-3}$Eu$^{2+}$ phosphor upon stimulation thereof. Accordingly, the sensitivity of the radiation image recording and reproducing method using these radiation image storage panels in accordance with the present invention is approximately double the sensitivity of the method using the radiation image storage panel made of the BaFCl:$10^{-3}$Eu$^{2+}$ phosphor.

We claim:
1. A radiation image recording and reproducing method comprising the steps of: exposing a stimulable phosphor containing a bivalent europium activated complex halide phosphor, said phosphor emitting light of higher luminance than the luminance obtainable with a conventional BaFX:Eu$^{2+}$ phosphor upon stimulation thereof, and being represented by the following general formula:

$$BaFX.xNaX'.aEu^{2+}$$

wherein X and X' each designate at least one of Cl, Br and I, x is a number satisfying $0<x\leq 10^{-1}$, and "a" is a number satisfying $0<a\leq 0.2$, to a radiation passing through an object to have the radiation energy stored in said stimulable phosphor, stimulation said stimulable phosphor by an electromagnetic wave having a wavelength within the range of 450 nm to 1,100 nm, thereby causing said stimulable phosphor to emit said radiation energy in the form of light, and detecting the emitted light.

2. A method as defined in claim 1 wherein said x is a number satisfying $10^{-5}\leq x\leq 10^{-2}$.

3. A method as defined in claim 1 wherein said "a" is a number satisfying $10^{-5}\leq a\leq 10^{-1}$.

4. A method as defined in claim 1 wherein said electromagnetic wave has a wavelength within the range of 450 nm to 750 nm.

5. A method as defined in claim 1 wherein said electromagnetic wave is a laser beam.

6. A method as defined in claim 5 wherein said laser beam is a He—Ne laser beam.

* * * * *